US006983159B2

(12) United States Patent
Di Pasquale et al.

(10) Patent No.: US 6,983,159 B2
(45) Date of Patent: Jan. 3, 2006

(54) OPTIMUM ALLOCATION OF TMSI AND P-TMSI IN MOBILE COMMUNICATION SYSTEMS

(75) Inventors: Gianluca Giovanni Di Pasquale, Milan (IT); Vatche Varvarian, Aachen (DE); Arndt Ritterbecks, Sinnelveld (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 498 days.

(21) Appl. No.: 10/020,120

(22) Filed: Dec. 18, 2001

(65) Prior Publication Data

US 2002/0168977 A1 Nov. 14, 2002

Related U.S. Application Data

(60) Provisional application No. 60/270,629, filed on Feb. 23, 2001.

(51) Int. Cl.
*H04Q 7/20* (2006.01)

(52) U.S. Cl. .............. 455/461; 455/435.1; 379/221.13; 379/221.14

(58) Field of Classification Search ................ 455/461, 455/435.1; 379/221.01–221.15
See application file for complete search history.

(56) References Cited

U.S. PATENT DOCUMENTS

| 5,375,251 | A | * | 12/1994 | Pfundstein ................... 455/551 |
| 5,920,814 | A | * | 7/1999 | Sawyer et al. ............ 455/422.1 |
| 6,039,624 | A | * | 3/2000 | Holmes ....................... 455/403 |
| 6,208,628 | B1 | * | 3/2001 | Monrad et al. .............. 370/328 |
| 6,463,154 | B1 | * | 10/2002 | Patel ........................... 380/270 |
| 6,680,920 | B1 | * | 1/2004 | Wan ............................ 370/311 |

* cited by examiner

*Primary Examiner*—Sonny Trinh
*Assistant Examiner*—Un C Cho

(57) ABSTRACT

A TMSI, comprising a TMSI identification field and a TMSI generation field, is allocated to a mobile subscriber. For non-restart situations, this involves selecting an unused TMSI identification field value; determining an associated present TMSI generation field value; and performing a normal allocation adjustment to the present TMSI generation field value, thereby producing an adjusted TMSI generation field value. A complete TMSI is generated from the selected TMSI identification value and the adjusted TMSI generation field value. The complete TMSI is allocated to the mobile subscriber. For a normal release situation, the TMSI identification value is processed so that it will be considered unused, and a normal deallocation adjustment is performed to the adjusted TMSI generation field value. In some embodiments, the normal deallocation adjustment restores the TMSI generation field to its earlier value. In an abnormal release, the TMSI generation field value is left unchanged.

20 Claims, 10 Drawing Sheets

OPTIMUM ALLOCATION OF TMSI AND P-TMSI IN MOBILE COMMUNICATION SYSTEMS

CROSS REFERENCE TO RELATED APPLICATIONS

This application claims the benefit of U.S. Provisional Application No. 60/270,629, filed Feb. 23, 2001, which is hereby incorporated herein by reference in its entirety.

BACKGROUND

The present invention relates to mobile communications systems, and more particularly to techniques for allocating Temporary Mobile Subscriber Identities (TMSIs) in circuit switched and/or packet switched mobile communications systems.

Mobile communications systems are well known. In so-called "cellular" or "mobile" networks, a large geographical area is divided up into so-called cells. Each cell is served by a corresponding base station, which uses radio-communication techniques to link mobile units located within the cell to a land-based part of the cellular communication system. The land-based part of the cellular communication system (called the Public Land Mobile Network—"PLMN") is capable not only of linking communications between mobile units located in the same or different cells, but also of connecting a mobile user to other communications networks, such as a Public Switched Telephone Network (PSTN) and/or a computer-oriented data network. In this way, a mobile user may be capable of establishing a call to (or receiving a call from) a non-mobile telephone (a so-called "Plain Old Telephone", or "POT") or to processing equipment connected to a computer network. When a user of a mobile unit moves from one cell to another, responsibility for maintaining any ongoing call that he may be participating in shifts from the original cell to the new "target" cell, in an operation referred to as "handoff" or "handover".

The cellular radiocommunication industry has made phenomenal strides in commercial operations in many countries around the world. Growth in major metropolitan areas has far exceeded expectations and is rapidly outstripping system capacity. If this trend continues, the effects of this industry's growth will soon reach even the smallest markets. Innovative solutions are required to meet these increasing capacity needs as well as to maintain high quality service and avoid rising prices.

While the basic principles outlined above are generally applicable to all such mobile communications systems, each system implementation is made in conformance with a selected one of a number of possible standards. In order to facilitate an understanding of the invention, the various problems and inventive solutions described herein are presented in the context of the well-known Global System for Mobile Communications (GSM), General Packet Radio Service (GPRS) and 3rd Generation Partnership Project (3GPP) standards, each of which is well-known and need not be described herein in detail. However, it should be understood that the principles to be discussed are not restricted to only those systems, but instead are readily transportable in alternative embodiments to mobile communications systems implemented in accordance with other standards that utilize the equivalent of a TMSI.

In mobile networks, the Visitor Location Registers (VLRs) and Serving GPRS Support Nodes (SGSNs) support identity confidentiality by allocating a TMSI to each visiting mobile subscriber (MS). The TMSI is a temporary identity alias that is used instead of the permanently-assigned International Mobile Subscriber Identity (IMSI). This alias must be agreed on before-hand between the mobile station and the network during protected signaling procedures. A mobile station (MS) can be allocated two TMSIs: one for services provided through the Mobile Switching Center (MSC), and another (called P-TMSI) for services provided through the SGSN. A mobile is considered "visiting" when it attaches to a specific VLR and/or SGSN of the PLMN.

To facilitate the discussion, all references to "TMSI" (whether abbreviated or spelled out as "Temporary Mobile Subscriber Identity") in this document should be construed to mean "TMSI and/or P-TMSI", unless otherwise stated.

Since the TMSI has only local significance (i.e., within a VLR area controlled by a VLR, or within an SGSN area controlled by an SGSN), the coding of the TMSI can be chosen by agreement between operator and manufacturer in order to meet local needs.

The TMSI consists of a predefined number of bits, such as four octets (i.e., thirty-two bits). It can be coded using a full hexadecimal representation. In areas where both MSC-based services and SGSN-based services are provided, some discriminating coding is done to distinguish between the allocation of TMSIs for MSC-based services and the allocation of TMSIs for SGSN-based services.

FIG. 1 is a diagram of a conventional TMSI 100 that is used in exemplary existing systems. In this example, the discriminating coding is located in a Circuit Switched (CS)/Packet Switched (PS) field 101 that occupies the two most significant bits of the TMSI 100. In the CS/PS field 101, the values 00, 01 and 10 are used to indicate that the TMSI 100 is associated with VLR-based services (i.e., CS-based services); the remaining value "11" is used to indicate that the TMSI 100 is associated with SGSN-based services (i.e., PS-based services). Of course, in other systems, the CS/PS field could be encoded in other ways. Furthermore, the CS/PS field need not be located in the most significant portion of the TMSI, nor does it have to be two-bits wide.

The basic problem of 2nd generation (2G) and future 3rd Generation (3G) networks is the expected huge increase in the amount of traffic to be handled, and in the number of subscribers in both GSM and Universal Mobile Telecommunication System (UMTS) markets. The traditional solution to the MSC capacity problem has been to develop more powerful processors for the MSCs and, when that is no longer possible, to add MSCs to the network. The addition of the MSCs to the network has, however, led to new problems, namely the need for continuous network re-configurations and the increase in location updating and inter-MSC handover traffic. The same applies also to SGSN nodes, for both 2G and 3G networks.

To tackle both problems (capacity and network configuration) an approach based on the "MSC in pool" (for 2G networks) and "SGSN in pool" (for 3G networks) concepts has been proposed. To better appreciate the various aspects of the pool concept (to be described below with reference to FIG. 2), it is helpful to first examine existing cellular network architectures.

In current cellular network architectures there is a hierarchical structure between core network nodes (MSC/VLR and SGSN) and radio access network nodes (Base Station Controller/Radio Network Controller—"BSC/RNC"). In today's systems, a number of base stations are grouped together and associated with a BSC/RNC. BSCs/RNCs are, in turn, grouped together and associated with, an MSC/VLR and an SGSN. In other words, from the core network (CN) perspective, the current network philosophy is to geographically divide the region between the available core network resources, that is, an MSC/VLR in the CS domain and an SGSN in the PS Domain.

By contrast, and with reference to the block diagram of FIG. 2, the characteristics of the pool concept are that the hierarchical network structure is arranged such that:

Each MSC and/or SGSN server within the pool 201 serves the same service area (i.e., the so-called "pool service area."

Each of the RNCs 203 within the pool service area is connected to each of the servers within the pool 201, that is, an RNC/BSC can now contact several MSC's/SGSN's.

The RNCs 203 within the pool service area have a traffic distribution functionality, which distributes the mobile traffic between the servers within the pool 201 and achieves in that way a load distribution between the servers.

A greater detailed description of the "in pool" concept can be found, for example, in "3rd Generation Partnership Project; Technical Specification Group Services and System Aspects; Intra Domain Connection of RAN Nodes to Multiple CN Nodes; (Release 5)", 3GPP TS 23.xyz, v0.0.0 (2001-01), which is hereby incorporated herein by reference in its entirety.

As anticipated by the last bulleted paragraph, the problem when introducing server pools in the core network is determining on what basis an RCN/BSC should decide which MSC/SGSN to route messages to.

The solution currently suggested is to distribute the messages based on the value of the TMSI. The TMSI is the 32-bit temporary identity assigned to a subscriber by the MSC/VLR or SGSN, but as applied in this environment it is unique within an entire pool service area instead of just a single server.

Indeed, in accordance with this strategy, each server (MSC/VLR and SGSN) of the pool 201 handles only a subset of all possible TMSIs, and each RNC 203 always distributes/assigns the subscriber to the same and unique server of the pool 201, based on the TMSI that the subscriber has.

The assumption behind this distribution concept is that each subscriber (or group of subscribers) produces on average the same amount of load on the system. Consequently, the load ought to be at least approximately evenly distributed among the various servers within the pool 201.

A problem arises, however, when one attempts to apply existing TMSI allocation strategies to the new "in pool"-based environment. To better understand the nature of this problem, it is helpful to first examine how TMSIs are structured and allocated in existing systems.

Presently, in systems not employing the "in pool" concept, the TMSI is allocated on a per-VLR basis (i.e., the TMSI is unique on VLR level).

The structure of a prior art TMSI 300 is shown in FIG. 3. Here it can be seen that, in addition to the CS/PS field 101, the TMSI 300 is made up of two fields: a TMSI identification field 301 which points to the subscriber records in the VLR (each server is able to handle up to 1 million subscribers), and a TMSI generation field 303. In this example, the TMSI identification field 301 is 20 bits wide (which is capable of representing a unique value for each of the 1 million potential subscribers), and the TMSI generation field 303 is 12 bits wide.

The 12-bit TMSI generation field 303 is wide enough to allow 3,072 TMSI generation values for CS services and 1,024 TMSI generation values for PS services.

Double allocation is a situation in which two different MSs hold the same TMSI identification with the same generation value at the same time. As can be imagined, this would be a problem since it would be impossible, under these circumstances, for the system to distinguish one MS from the other. The TMSI generation field is used to avoid double allocation of TMSIs. For example, if a subscriber A with a given TMSI identification value does not show up anymore (i.e., the subscriber does not do a "Cancel Location" operation) then this TMSI identification value should (and will) be released after a certain period of time so that it can be used for another user B. Otherwise, a TMSI identification field value would be blocked forever and the number of free TMSI identification values would decrease. To distinguish the new subscriber B from subscriber A (who should not be allowed to use his old TMSI anymore), the TMSI identification field value is additionally associated with a "TMSI generation" value which tells the system the current generation of a certain TMSI identification value. Only the subscriber using a TMSI identification value associated with the correct generation field value is allowed to access the network.

The TMSI generation field value is stepped each time an already released TMSI identification field value is allocated to a different/new subscriber, due to any of the following reasons:

a subscriber moves to a different location area (LA) of the same VLR; or a Cancel Location occurs when the subscriber moves to a new LA in a new VLR service area.

After some time, the TMSI generation field value will likely be stepped several times, but not equally for all TMSI identification values. For example, it can happen that TMSI identification field value 5075 is in generation 8, while the TMSI identification field value 2034 is still in generation 2.

If one of the following happens:

MSC/VLR restart with reload;

HLR reset; or

Deregistration (Purge from HLR), then the TMSI generation field value is again stepped, but this time by a value higher than 1, such as 50 or even 500! This is necessary because in these instances, the VLR loses all information about the TMSI generation values, and therefore doesn't know in which generation the various TMSI identification values were. In order to make sure that all subscribers/terminals are released from the network, which would force them all to re-register (necessary when a restart happens), each of the TMSI generation field values has to be set high enough to cause it to exceed the value that it had just before the restart-causing event. A step size of 50–500 (which is used in today's systems) is assumed to be large enough to ensure this condition. The relatively large range of the generation field values (3,072 possibilities for CS services, 1,024 possibilities for PS services) allows the use of such large steps, although in most cases they are probably much larger than actually necessary. Only in rare instances will it happen that there are users who had previously been assigned an even higher TMSI generation field value. Extra signaling is required to then release these few users, but the small number of them means that the higher signaling load is small, and therefore no problem. Thus, with the current TMSI allocation policy of TMSI generation stepping, the probability of double TMSI allocation is very low.

Turning now to systems that employ the "in pool" concept, such systems require a restructuring of the TMSI. In particular, the entire TMSI range has been divided among different servers, so that only a certain range of the TMSI values is valid for any given server.

As of this writing, 3GPP plans to standardize the TMSI structure 400 depicted in FIG. 4. A Domain field 401 is 3-bits wide, and its value identifies whether the TMSI is associated with CS services, PS services, or other uses.

A TMSI generation field 403 is present, but is allocated only 5 bits out of the entire TMSI 400.

A Server pointer field 405 is allocated 7 bits of the TMSI 400.

A TMSI identification field 407 in the TMSI is allocated 17 bits, which enables the addressing of up to 132K subscribers.

In use, each subscriber will be assigned the correct server based on the value of the server pointer field 405. Each server will be able to handle 132K subscribers.

This new TMSI structure 400 presents problems with respect to TMSI allocation. In particular, The TMSI generation field has been reduced to only 5 bits, which means that there are only 32 possible values. As a result of this reduction, the probability of a double TMSI allocation occurring becomes much higher if conventional TMSI allocation strategies are employed.

Moreover, a step by 50 to 500 is not even possible anymore, so a new algorithm is needed to replace the former procedure of incrementing in the range of 50–500. Furthermore, the conventional technique for picking a step size is not ideal, since under the conventional TMSI allocation strategy, the appropriate step size depends very much on the future user behavior and mobility pattern. In some cases a step size of 8 could be a good value, while in other cases the step size should be 15 or higher.

Selection of a suitable step size also depends on the type of server, MSC or SGSN. There is also uncertainty whether a value of, for example, 8 will be the best one to use all the time.

There is therefore a need for a TMSI allocation strategy, and supporting apparatuses, that are suitable for use with communication systems that employ the "in pool" concept.

There is also a need for strategies, and supporting apparatuses, for determining what step size(s) to use for a given system.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that perform a special adjustment to a temporary mobile subscriber identity generation field value for use in response to a restart operation. This involves determining a minimum integer amount that is higher than temporary mobile subscriber identity generation field values associated with a predetermined percentage of all mobile subscribers; and adjusting the temporary mobile subscriber identity generation field value as a function of the minimum integer amount. In some, but not necessarily all, embodiments, the adjustment is performed by setting the temporary mobile subscriber identity generation field value equal to the minimum integer amount.

In accordance with another aspect of the present invention, the foregoing and other objects are achieved in methods and apparatuses that manage a Temporary Mobile Subscriber Identity (TMSI) to a mobile subscriber, wherein the TMSI comprises a TMSI identification field and a TMSI generation field. This involves selecting an unused TMSI identification field value; determining a present TMSI generation field value associated with the selected TMSI identification field value; performing a normal allocation adjustment to the present TMSI generation field value, thereby producing an adjusted TMSI generation field value; and generating a complete TMSI from the selected TMSI identification value and the adjusted TMSI generation field value.

In some embodiments, these steps are performed only if an unused TMSI identification field value exists. In other cases (i.e., if an unused TMSI identification field value does not exist), the allocation involves selecting any available TMSI identification field value; determining a present TMSI generation field value associated with the selected TMSI identification field value; and performing a special allocation adjustment to the present TMSI generation field value, thereby producing an adjusted TMSI generation field value. A complete TMSI is then generated from the selected TMSI identification value and the adjusted TMSI generation field value.

Regardless of how it is generated, the complete TMSI is allocated to the mobile subscriber.

In response to a first type of release causing event in which the mobile subscriber is informed that the TMSI is being released, the TMSI identification value is processed so that it will be considered unused, and a normal deallocation adjustment is performed to the adjusted TMSI generation field value. In response to a second type of release causing event in which the mobile subscriber is not informed that the TMSI is being released, the TMSI identification value is processed so that it will be considered available, and the adjusted TMSI generation field value is left unchanged.

In exemplary embodiments, the normal allocation adjustment to the present TMSI generation field value includes changing the present TMSI generation field value by a predetermined value. For example, the normal allocation adjustment to the present TMSI generation field value can mean incrementing the TMSI generation field value by an amount equal to 1.

Alternatively, the normal allocation adjustment to the present TMSI generation field value includes changing the present TMSI generation field value by a predetermined value.

In some embodiments, the normal deallocation adjustment to the adjusted TMSI generation field value includes performing an operation that restores the adjusted TMSI generation field value to the present TMSI generation field value. For example, where the normal allocation adjustment means incrementing the TMSI generation field value by an amount equal to 1, the normal deallocation adjustment means decrementing by 1.

In another aspect, the special allocation adjustment includes changing the present TMSI generation field value as a function of a minimum integer amount that is higher than TMSI generation field values associated with a predetermined percentage of all mobile subscribers. In some embodiments, this can be carried out by setting the present TMSI generation field value equal to the minimum integer amount that is higher than TMSI generation field values associated with the predetermined percentage of all mobile subscribers.

In some embodiments, determining the minimum integer amount that is higher than TMSI generation field values associated with the predetermined percentage of all mobile subscribers includes determining a probability density as a function of TMSI generation value; integrating the probability density across an entire range of TMSI generation values to determine a total integral; and determining the integer amount such that an integral of the probability density from zero to the integer amount yields a smaller integral that is the predetermined percentage of the total integral.

BRIEF DESCRIPTION OF THE DRAWINGS

The objects and advantages of the invention will be understood by reading the following detailed description in conjunction with the drawings in which.

DETAILED DESCRIPTION

Figure 1:
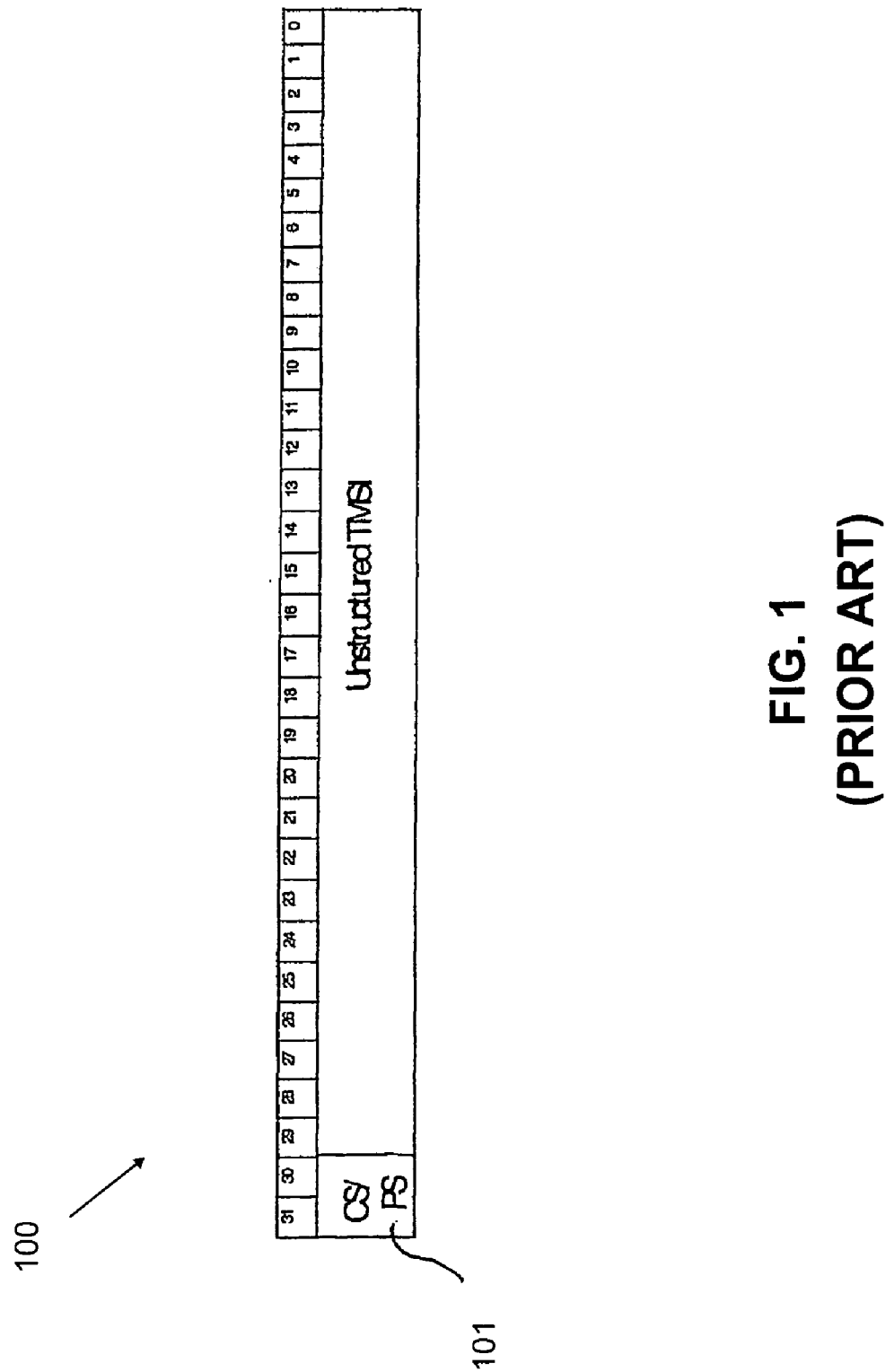
FIG. 1 is a diagram of a conventional TMSI that is used in exemplary existing systems.
Figure 2:
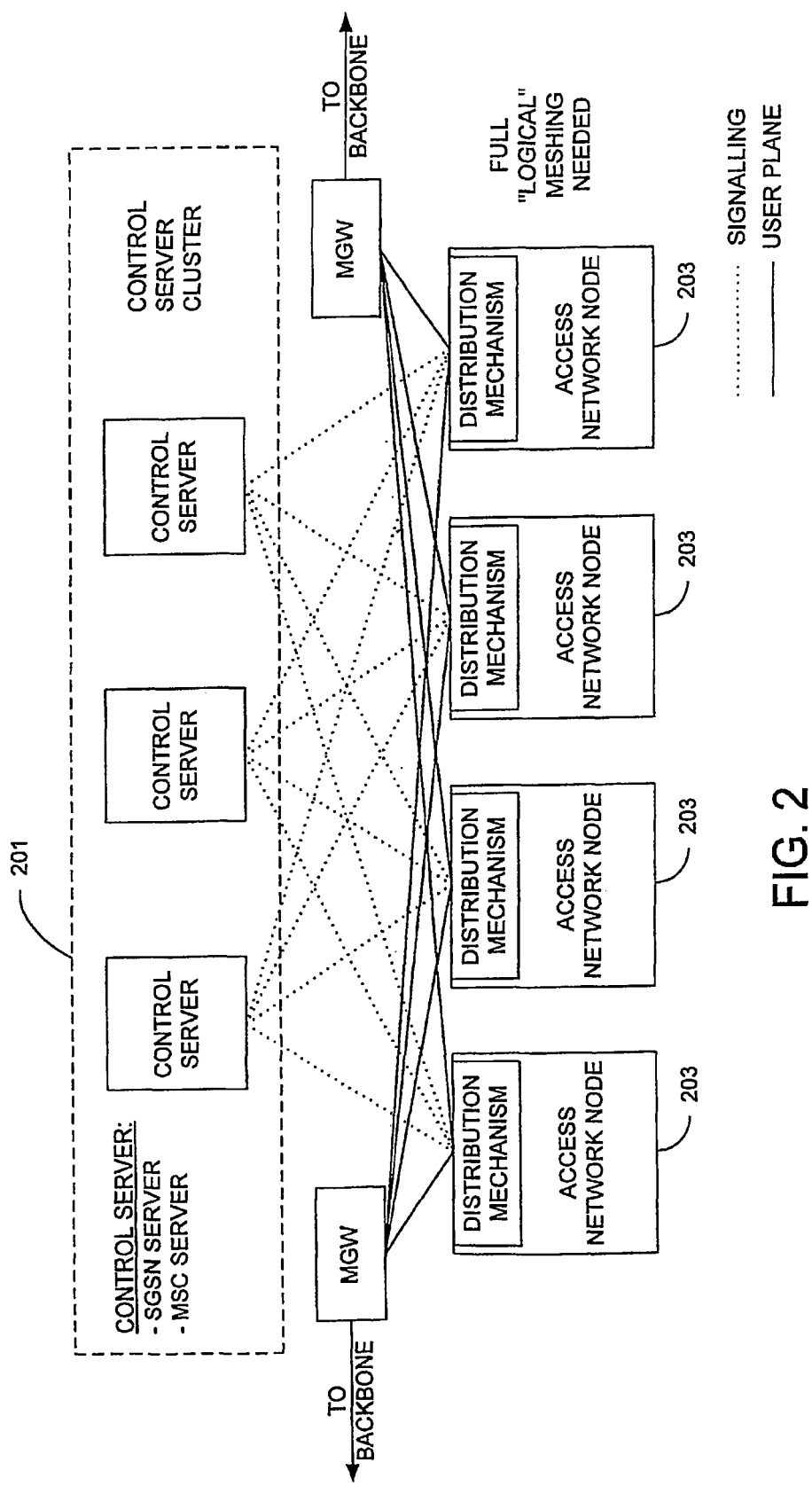
FIG. 2 is a block diagram illustrating the organization and characteristics of a hierarchical network structure that employs the "in pool" concept.
Figure 3:
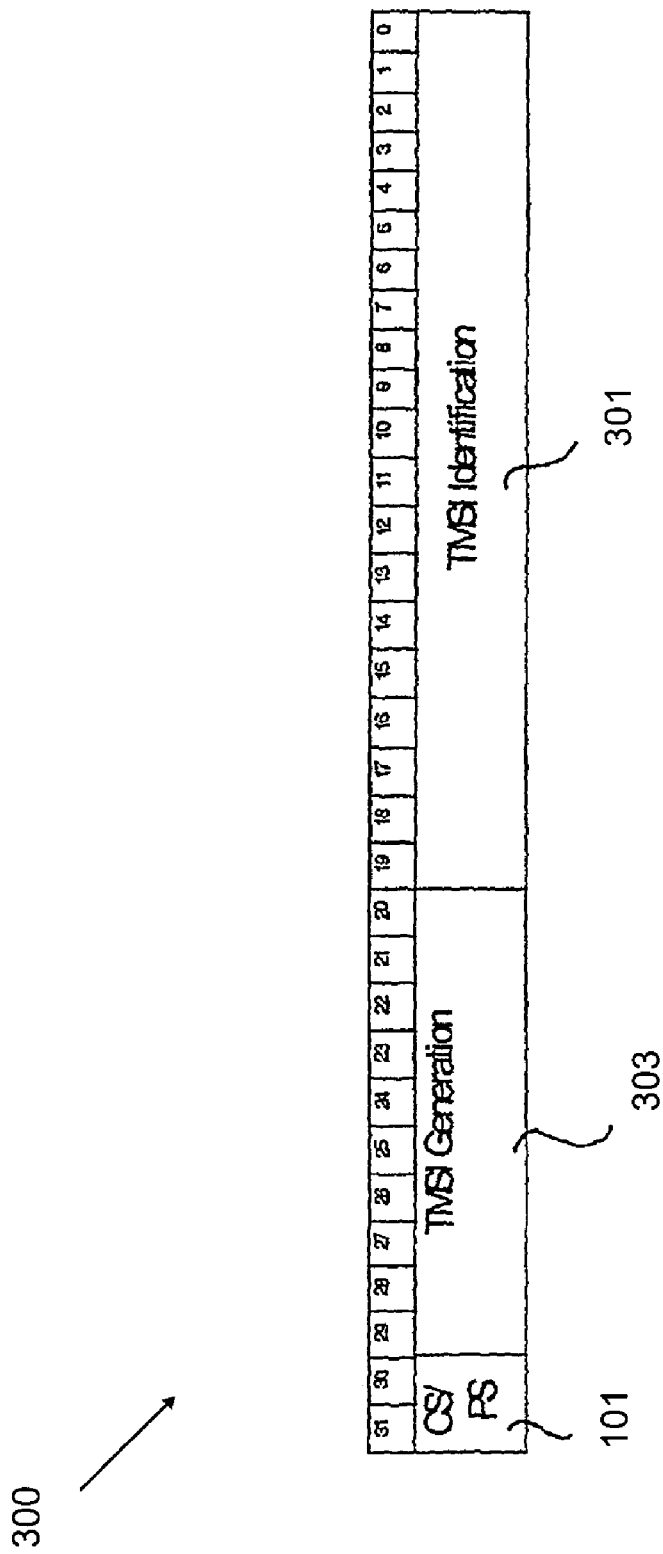
FIG. 3 is a diagram that depicts the structure of a prior art TMSI.
Figure 4:
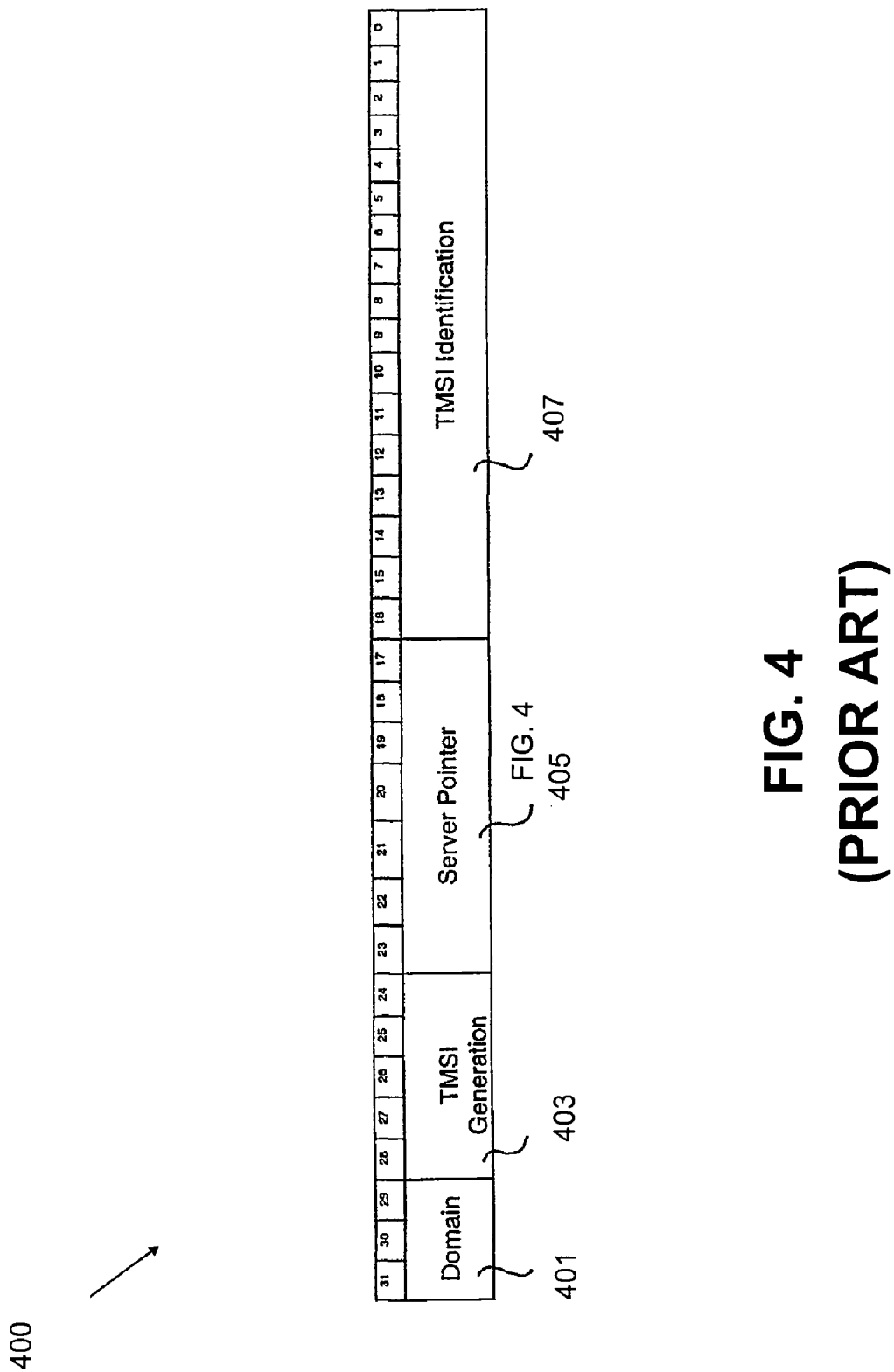
FIG. 4 is a diagram of a TMSI structure for use in a communications system that employs the "in pool" concept.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of one or more computer systems. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause one or more processors to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

The inventors have determined that the conventional technique of stepping the TMSI generation by 1 each time a TMSI identification is assigned to a subscriber, and by a number between 50 and 500 each time after a restart will cause quite a bit of numerical spreading over the TMSI generation field of the VLR's TMSIs.

Furthermore, with this conventional approach, the spreading is also strongly related to user mobility behavior. That is, in VLRs in which TMSIs are allocated and reallocated rather frequently because users are heavily moving between different Location Areas, the TMSI generation field values get stepped quite quickly compared to VLRs covering areas in which subscribers have a more static behavior. This sensitivity to mobility will become even more important in the near future, when Location Areas are expected to become smaller and smaller in order to satisfy the capacity needs.

To gain a better understanding of the TMSI-value spreading problem associated with conventional TMSI allocation techniques, the discussion will first consider how conventional VLRs and SGSNs allocate a TMSI value to a subscriber. When a subscriber enters the VLR (or SGSN) serving area for the first time, the server has to provide the terminal with a TMSI. In this respect, the server has to assign a TMSI that has not already been assigned to anyone else. To obtain an unused TMSI identification value, the server turns first to a primary list, and if that is not successful, then to a secondary list. The primary list contains all unused TMSI identification values that have been properly released and are therefore considered to be "trusted"; that is, there is no risk that the TMSI identification value has been allocated to another MS. To be considered "trusted", the last user of the TMSI identification value has to have released the TMSI identification value due to a Cancel Location or a TMSI Reallocation operation. With either of these release-causing events, the MS is informed of the release.

If the TMSI identification value is released due to any other reason, then the release is considered improper, which means that there is some risk that another MS will still try to contact the network using the TMSI identification value. These non-trusted TMSI identification values are maintained in the secondary list. Because of the possibility that there still exists an MS that will attempt to access the system using a non-trusted TMSI identification value, such values are not considered "unused", but are rather considered merely "available", and may be assigned to a new MS under circumstances that are described in detail below. It will be recognized that "unused" TMSI identification values are also "available." Thus, as used herein, the term "available" is used to refer to both "trusted" and "non-trusted" TMSI identification values.

Hence, the server constructs the TMSI as follows, and as illustrated in the flow diagram of FIG. 5:

First, the server selects an available TMSI identification value for use in generating the complete TMSI (step 501).

Next, the server determines (e.g., by examining one or more state variables associated with the TMSI identification values) whether this is the first time after a restart operation that the selected TMSI identification value is being allocated (decision block 503). If not ("NO" path out of block 503), then the server also determines whether the selected TMSI identification value came from the primary list or the secondary list (decision block 505).

If the selected TMSI identification value was selected from the primary list ("YES" path out of decision block 505), then the server obtains the last TMSI generation value associated with the selected TMSI identification value and steps that TMSI generation value by a value of +1 (step 507). However, if the selected TMSI identification value was instead selected from the secondary list ("NO" path out of decision block 505), then the server obtains the last TMSI generation value associated with the selected TMSI identification value and steps that TMSI generation value by a value in the range 50–500. The particular value used in this instance is implementation dependent. Note that stepping the TMSI generation field value by an amount in the range 50–500 will result in spreading the TMSI generation values.

Returning to decision block 503, it may be the case that this is the first time that the TMSI identification value is being allocated after a restart operation. This means that the server has lost track of all of the TMSIs that it had been in control of, and cannot therefore consider any of the TMSI identification values "trusted". In this case ("YES" path out of decision block 503), the server obtains the selected TMSI identification value's associated TMSI generation value. This associated TMSI generation value is then stepped by a value in the range between 50 and 500 (step 511).

After a TMSI identification field has been selected and its associated TMSI generation value obtained and stepped (by any of the various techniques described above), the complete TMSI is generated from the selected TMSI identification field value and updated TMSI generation field value (step 513).

When a subscriber leaves for a new service area (e.g., when the subscriber moves under the control of another server), it is assigned a new TMSI from the new server, and its old TMSI is released within the old server (step 515). What this means in the old server is that the old TMSI identification field value is processed in some fashion so that it will be considered available, and the TMSI generation field value last associated with this TMSI identification field value is left unchanged with the last value.

Figure 6:
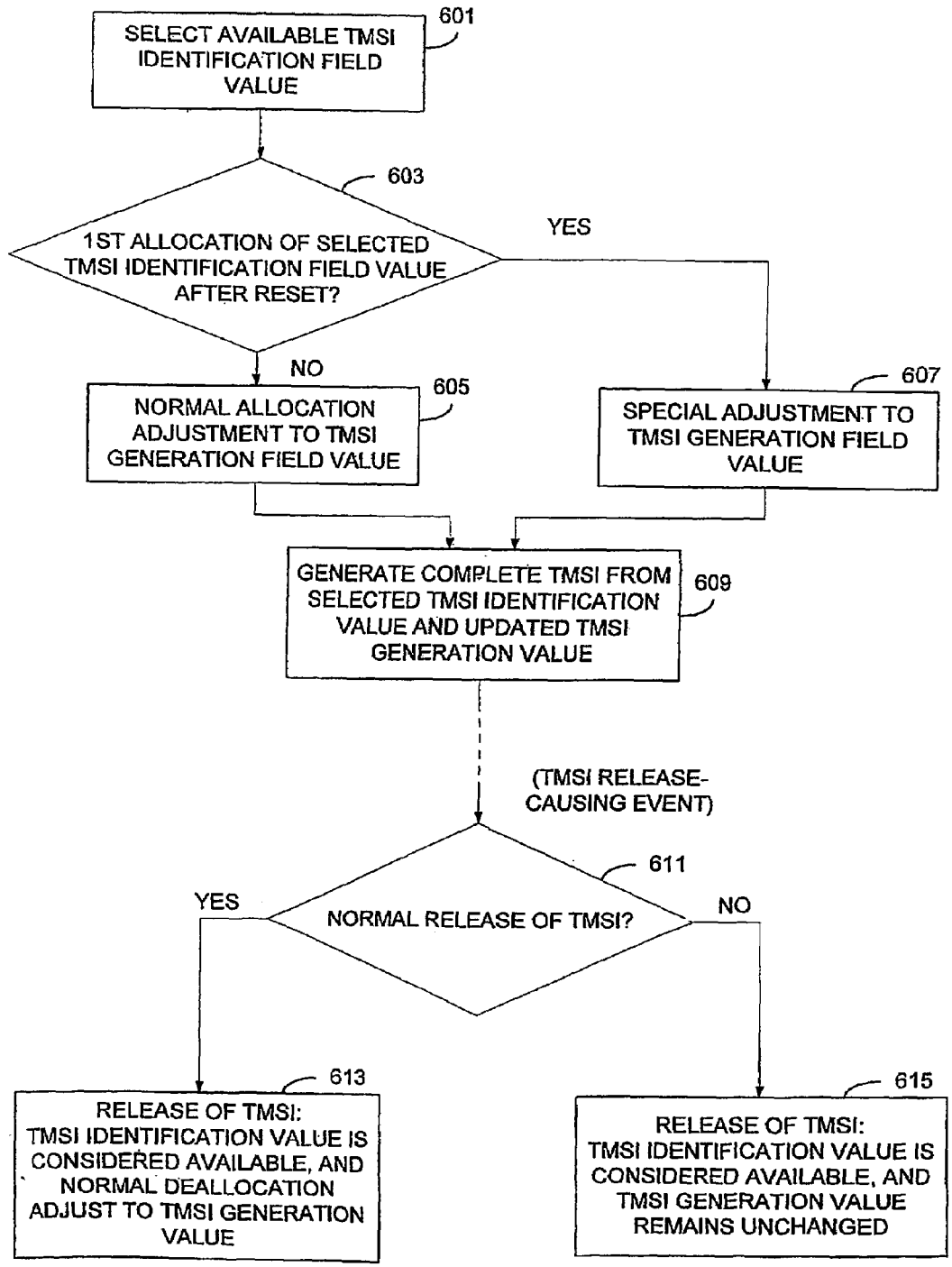
FIG. 6 is a flow diagram of a TMSI allocation strategy in accordance with an aspect of the invention.

As mentioned earlier, the conventional TMSI allocation technique, just discussed, results in a great deal of spreading of the TMSI generation value. This level is unacceptable when applied to a system in which the range of possible TMSI generation values is substantially reduced (e.g., limited to 5-bit values instead of 10-bit values). To address this problem, a new TMSI allocation strategy will now be described with reference to the flow diagram of FIG. 6.

First, the server selects an available TMSI identification field value for use in generating the complete TMSI (step 601).

Next, the server determines whether this is the first time after a restart operation that the selected TMSI identification value is being allocated (decision block 603). If not, ("NO" path out of decision block 603), then the server performs what in this description is called a "normal allocation adjustment" (step 605). In an exemplary embodiment, the normal allocation adjustment means incrementing the TMSI generation value by +1. However, in alternative embodiments, the normal allocation adjustment may involving decrementing the TMSI generation value by –1; incrementing or decrementing the TMSI generation value by non-zero amounts other than +1/–1; or even performing other types of adjustments (e.g., multiplying the TMSI generation value by 2).

Figure 5:
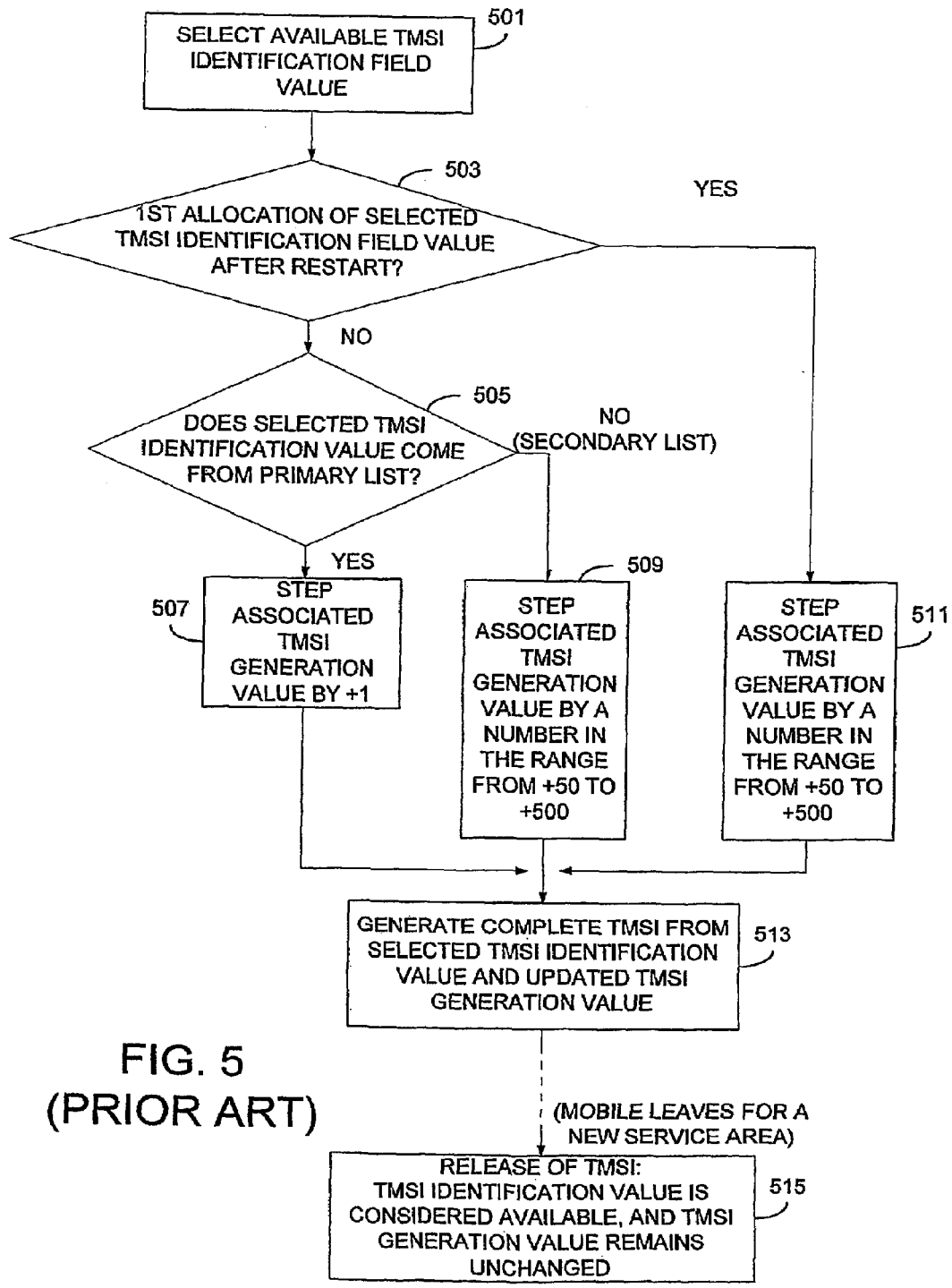
FIG. 5 is a flow diagram of a conventional method for allocating TMSIs in a communications system.

It will be observed that, unlike the conventional technique illustrated in FIG. 5, the server does not need to determine whether the selected TMSI identification value was selected from the primary list or from the secondary list, because, in either case, the server obtains the last TMSI generation value associated with the selected TMSI identification value.

Returning to decision block 603, it may be the case that this is the first time that the TMSI identification value is being allocated after a restart operation. As explained earlier, this means that the server has lost track of all of the TMSIs that it had been in control of, and cannot therefore consider any of the TMSI identification values "trusted". In this case ("YES" path out of decision block 603), the server obtains the selected TMSI identification value's associated TMSI generation value, and modifies this associated TMSI generation value by performing what, in this description, is called a "special adjustment" (step 607).

The term "special adjustment" as used herein means adjusting the previous TMSI generation field value to a new special adjustment value that will invalidate, for example, 99.9% of the TMSI identification field values of subscribers registered before the server restarted. This can be carried out in a number of different ways. In some embodiments, the special adjustment is performed merely by setting all TMSI generation field values to this new special adjustment value. Thus, after a reset in such embodiments, all TMSI generation field values will initially be equal to one another (i.e., equal to the special adjustment value). This technique has the advantage of simplicity in implementation.

In alternative embodiments, the special adjustment can be performed by actually modifying (e.g., by incrementing or decrementing) each individual TMSI generation field value as a function of the special adjustment value that ensures that the predetermined percentage (e.g., 99.9%) of TMSI identification field values in use prior to the restart will be considered invalid.

Regardless of how the special adjustment is carried out, in embodiments using 5-bit TMSI generation fields, the special adjustment value could be, for example, +8. In alternative embodiments, however, the value could be different, and/or the type of modification performed could be different (e.g., decrementing or multiplying instead of incrementing or reinitializing).

A technique for calculating the special adjustment value to be used in the performance of special adjustments is described later in this description.

It should be noted that the special adjustment value used in a special adjustment also sets a new "floor" value for TMSI generation field values, in the event that a TMSI generation field value is incremented past its highest representable value. For example, where the most-recent special adjustment value is +8, a TMSI generation field value that needs to be incremented past the number 31 (e.g., where the TMSI generation field is only 5-bits wide) will wrap-around to +8, rather than to a value of zero. This has the effect of further limiting the range of available TMSI generation field values, but is necessary to avoid the possibility of double allocation.

Returning now to FIG. 6, after a TMSI identification field has been selected and its associated TMSI generation value obtained and stepped (by any of the various techniques described above), the complete TMSI is generated from the selected TMSI identification field value and updated TMSI generation field value (step 609).

When a TMSI release-causing event occurs, a decision is made as to whether or not this is a "normal" release of the TMSI (decision block 611). A normal release of the TMSI is one that is instigated by performance of either a Cancel Location operation or a Location Area update operation. Any other release of the TMSI within the VLR/SGSN without informing the MS of the release is considered not to be normal.

If a normal release of the TMSI occurs ("YES" branch out of decision block 611), then a release of TMSI is performed (step 613) in which the TMSI identification field value is processed in some fashion so that it will be considered available, and the TMSI generation field value last associated with this TMSI identification field value is modified by performance of what in this description is called a "normal deallocation adjustment." In an exemplary embodiment in which the normal allocation adjustment involves incrementing the TMSI generation value by +1, the normal deallocation means decrementing the TMSI generation value by a value of 1, thereby restoring the TMSI generation value to its earlier value. However, as mentioned above, alternative embodiments are possible, in which the normal allocation adjustment involves other operations, such as decrementing the TMSI generation value by 1; incrementing or decrementing the TMSI generation value by non-zero amounts other than +1/−1; or even performing other types of adjustments (e.g., multiplying the TMSI generation value by 2). In such cases, it is preferred that the normal deallocation adjustment procedure "undo" the operation performed during the normal allocation adjustment procedure. In this way, the TMSI generation value is again made available for reuse.

If the release of the TMSI is not considered "normal" ("NO" path out of decision block 611), then a release of TMSI is performed (step 615) in which the TMSI identification field value is processed in some fashion so that it will be considered "available" (as that term is defined above), and the TMSI generation field value last associated with this TMSI identification field value is left unchanged. In this way, if the same TMSI identification value is later seized for use by another MS, the TMSI generation value will be modified by the normal allocation adjustment procedure (e.g., by incrementing it by +1) thereby avoiding any possible double allocation. For example, if the old MS were later to try to access communication traffic still using the old TMSI identification and TMSI generation values, the VLR would be able to detect that the MS has an invalid TMSI identification due to the fact that the TMSI generation value provided by the MS will be lower (e.g., by 1) than the current and valid TMSI generation value stored in the VLR.

Examining the above-described strategy, it can be seen that each time an unused TMSI identification value is allocated to a new subscriber registering within the server, the associated TMSI generation field value is adjusted, for example, by increasing it by a value of 1. Upon successful release of this TMSI within the VLR/SGSN—either due to a Cancel Location or a Location Area update—the TMSI generation field value is adjusted in an inverse manner, for example by decreasing the value by 1. This enables the same TMSI identification value to be allocated to a different MS, hence reducing the spreading of the TMSI generation values.

Continuing with the examination of the new TMSI allocation procedure, note that upon performing Cancel Location or Location Area update it is guaranteed that the old MS will not continue to hold the old TMSI, and any subsequent access of this MS will be performed with a different TMSI identification value. This enables the use of the old TMSI identification and TMSI generation values for a new MS without running into the problem of double allocation.

On the other hand, if the TMSI is released within the VLR/SGSN for any other reason (i.e., releasing the TMSI within the VLR without informing the MS), then the TMSI generation field value associated with that TMSI identification field value is kept the same. When, later on, the same TMSI identification value is seized for use by another MS, the TMSI generation field value is adjusted, for example, by increasing it by a value of 1, thereby avoiding any possible double allocation. For example, if the old MS were to later try to perform a traffic access still using the old TMSI identification field and TMSI generation field values, then the VLR would be able to detect that the MS has an invalid TMSI identification, due to the fact that the TMSI generation field value provided by the MS will be lower (e.g., by 1) than the current and valid TMSI generation field value stored in the VLR.

Figure 7:
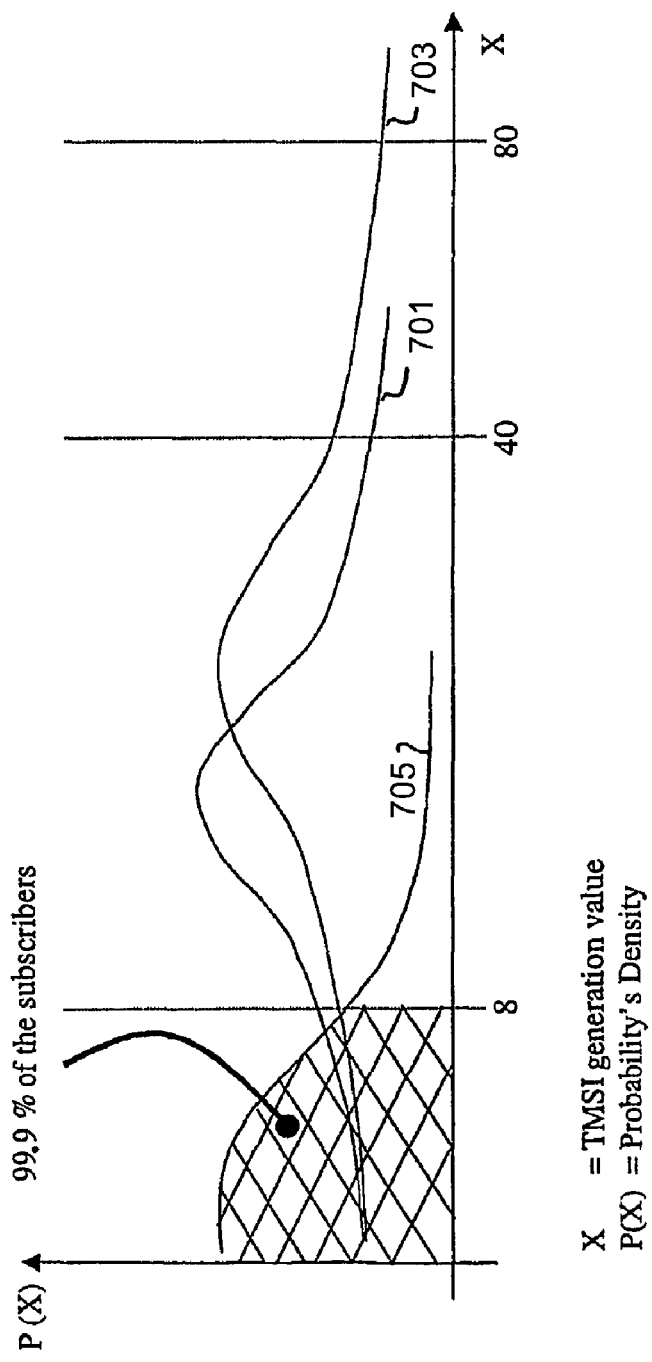
FIG. 7 is a collection of graphs showing the spreading of TMSI generation values that can result from the various TMSI allocation techniques described herein.

FIG. 7 is a collection of graphs showing the spreading of TMSI generation values that can result from each of the various TMSI allocation techniques described above. The horizontal axis shows the range of possible TMSI generation field values, and the vertical axis shows the probability density associated with a particular TMSI generation field value. Three graphs are shown. A first graph 701 shows the probability density of TMSI generation field values when those values are generated by conventional TMSI allocation techniques under circumstances in which user mobility is relatively low. A second graph 703 also shows the probability density of TMSI generation field values when those values are generated by conventional TMSI allocation techniques, but this time under circumstances in which user mobility is much higher. It can be seen that TMSI generation field value spreading is much higher when user mobility is higher.

A third graph 703 depicts the probability density of TMSI generation field values when those values are generated by the inventive technique described above with reference to FIG. 6. It can be seen that the spreading of these values is much lower than the spreading associated with either of the conventional TMSI allocation techniques.

Returning briefly to FIG. 6, it can be seen that each time there is a Server restart, TMSI generation field values of all TMSI identification field values held by the node are modified using the special adjustment (step 607). In an exemplary embodiment, this means increasing the TMSI generation field "reference" value (i.e., minimum valid TMSI generation field value) to an amount that will invalidate, for example, 99.9% of the TMSI identification field values of subscribers registered before the Server restarted. The increased value then becomes the new "reference value". The discussion will now focus on a method for calculating the magnitude of the necessary increment.

The spreading of the TMSI generation field values will follow one of the three curves 701, 703, 705 depicted in FIG. 7, depending on whether the old allocation method is followed (first and second graphs 701, 703) or the described new method is used (third graph 705).

In another aspect, a new technique is provided for determining what modification value to use when adjusting the TMSI generation field value after a restart (e.g., steps 511 and 607). More particularly, if the probability density curve is known for a range of TMSI generation field values allocated in a given way, then the optimal TMSI generation field value modification amount (i.e., the special adjustment value, as described earlier) for use after a restart can be easily derived by determining the minimum TMSI generation field value that is higher than the TMSI generation field values associated with a certain percentage of all users. In other words, the modification amount (special adjustment value) for use after a restart should be that TMSI generation field value that, when the integral of the curve is calculated up to that TMSI generation field value, results in a value that is the predefined percentage (e.g., 99.9%) of the total integral of the curve. In determining what special adjustment value to use, it is preferable that the value not exceed a number that is about one-half of the highest possible TMSI generation field value. For example, where the highest possible TMSI generation field value is "31" (which is the case for 5-bit TMSI generation fields), it is preferable that the special adjustment value not exceed a value of 16.

For example, for the third curve 705 in FIG. 7, it can be found that a value of "8" would be the optimal value to use for the start of the next TMSI generation field values because 99.9 percent of all users have a TMSI generation field value below this value. A bigger increment would not mean any significant improvement (e.g., the improvement would be in the range of only 0.0x percent) and would have the detrimental affect of wasting too many generation field values which increases the probability for double allocations if the generation field is as small as in today's standardization proposal (i.e., only 32 values in a 5-bit field).

Ideally, an optimal special adjustment value would be determined using the above-described technique each time a restart is performed. However, in practice, this dynamic computation of the special adjustment value would add a great amount of computational overhead to the process. Therefore, in practice the special adjustment value should be determined off-line.

The same technique is also applicable to determining a suitable post-restart increment value for use with conventional TMSI allocation strategies. For example, as mentioned above, conventional techniques typically increment the TMSI generation field value by an amount in the range from 50–500. However, it can be seen from FIG. 7 that for the conventional TMSI allocation strategy under conditions of low user mobility (graph 701), an appropriate step size is 40. By contrast, for the same conventional TMSI allocation strategy but under conditions of high user mobility (graph 703), a step size of 80 is appropriate.

The discussion will now focus on techniques for generating the probability density curves/parameters that are used to determine an optimal adjustment value for use with the TMSI generation field value after a restart operation.

Figure 8:
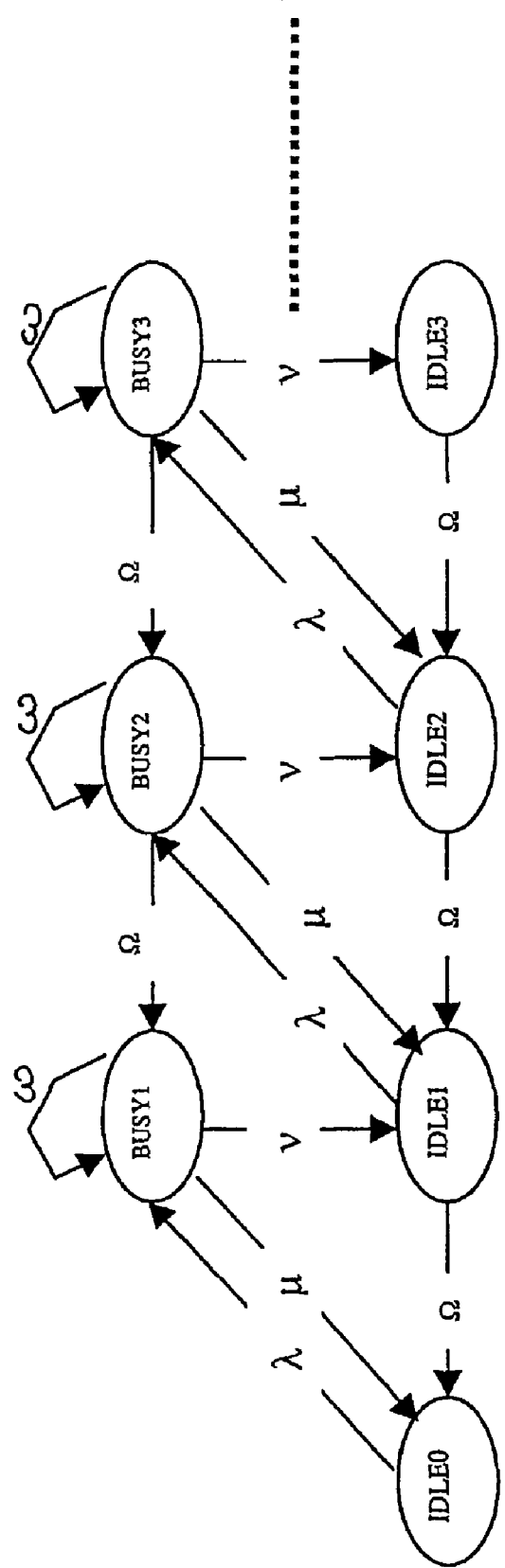
FIG. 8 is a diagram showing the possible state transitions that a TMSI can undergo.

FIG. 8 is a diagram showing the possible state transitions that a TMSI can undergo. As shown in the figure, the TMSI can either be in the IDLE state or in the BUSY state. The IDLE state indicates that the TMSI is available for usage. By contrast, the BUSY state indicates that there is a valid association between that TMSI identification value and a VLR record, meaning that the TMSI identification value is not available for a new allocation.

Initially, all TMSIs are in state IDLE0. Upon being seized, the TMSI moves to state BUSY1. At this point, there is a valid association both in the VLR and the MS. When the TMSI is released, either due to Cancel Location or to TMSI reallocation, the TMSI transitions back to state IDLE0. At this point, both the VLR and the MS remove the association of the TMSI.

Returning to state BUSY1, if the TMSI is released for reasons other than the two mentioned above, such as periodic registration timeout, the TMSI transitions to state IDLE1. In this process, the association in the VLR is removed, but there is the possibility that the MS still holds the association with the same TMSI.

Thus, the state IDLE1 indicates that there is the possibility of having one MS with the same TMSI identification field value. Note that TMSIs in state IDLE1 are still available for seizure by the VLR.

Analogous explanations apply for state transitions between IDLE1 to BUSY2, between BUSY2 and IDLE1, between BUSY2 and IDLE2, and so on.

Each TMSI includes two fields: a TMSI identification field and a TMSI generation field. Upon every seizure, the TMSI generation field value is changed in order to avoid double allocation.

The state transitions can be modeled mathematically as a Markov Chain, and the probability of being in each of the states IDLE0, IDLE1, . . . BUSY0, BUSY1, . . . and so on, can be determined. The resultant set of probability values can then be used to decide how large the TMSI generation field values need to be in order to avoid the occurrence of a double allocation.

The following table describes the symbols in FIG. 8 in greater detail.

| Symbol | Explanation |
| --- | --- |
| $\lambda$ | Request for TMSI allocation. An IDLE TMSI is seized from state IDLE_N and transitions to state BUSY_N + 1. The TMSI is allocated and the following relation exists MS - - - TMSI: VALID VLR - - - TMSI: VALID |
| $\mu$ | Request for TMSI release, due to Cancel Location, or TMSI Reallocation. $\mu$ indicates that TMSI has successfully been released in the VLR and has been cleared in the MS. The MS will not use the same TMSI for a subsequent traffic access. Therefore it can be inserted in the original IDLE list. (State BUSY_N transitions to state IDLE_N − 1). The following relation exists: MS - - - TMSI: CLEARED VLR - - - TMSI: CLEARED |
| $\omega$ | Correct traffic access, e.g., periodic registration. |
| $\nu$ | Request for TMSI release, due to reason other than Cancel Location. $\nu$ indicates that TMSI has been released successfully in the VLR but there is no guarantee that the MS has cleared the TMSI. Consequently, there is the possibility that the same MS will perform a subsequent traffic access with the same TMSI. Because of this possibility, the TMSI is inserted into the idle list on the same level, that is, state BUSY_N transitions to state IDLE_N. The following relation exists: MS - - - TMSI: VALID VLR - - - TMSI: CLEARED |
| $\Omega$ | TMSI reallocation. A traffic access has been made with an old TMSI, so that the TMSI generation field value does not match the currently valid value. Consequently, a new TMSI will be allocated to the MS. The stage or the state of the old TMSI is decremented. Note that the TMSI can either be in state BUSY or in state IDLE; hence it is decremented from state BUSY_N to state BUSY_N − 1, or from state IDLE_N to state IDLE_N − 1. |

The probability calculations can now be made, under the assumption that the system has reached stochastic equilibrium, and that the sum of all probabilities is equal to unity.

Idle State Probabilities:

In the following table, the following notation is used (refer also to FIG. 8):

$P_{n,i}$=Probability of being in state IDLEn, where n=0 .. N.
$P_{n,b}$=Probability of being in state BUSYn, where n=0 .. N.
λ=rate of transition from state IDLEn to state BUSYn+1.
μ=rate of transition from state BUSYn to state IDLEn−1.
Ω=rate of transition from state IDLEn to state IDLEn−1 or from state BUSYn to state BUSYn−1.
ν=rate of transition from state BUSYn to state IDLEn.
ω=rate of transition from state BUSYn to state BUSYn.

| State | Rate of arrival | Rate of departure |
|---|---|---|
| 0 | $\Omega.P_{1,i} + \mu.P_{1,b}$ | $\lambda.P_{0,I}$ |
| 1 | $\Omega.P_{2,i} + \nu.P_{1,b} + \mu.P_{2,b}$ | $\lambda.P_{1,i} + \Omega.P_{1,i}$ |
| 2 | $\Omega.P_{3,i} + \nu.P_{2,b} + \mu.P_{3,b}$ | $\lambda.P_{2,i} + \Omega.P_{2,i}$ |
| : | : | : |
| N | $\Omega.P_{N+1,i} + \nu.P_{N,b} + \mu.P_N + 1.b$ | $\lambda.P_{N,i} + \Omega.P_{N,i}$ |

Busy State Probabilities:

In the following table, the following notation is used (refer also to FIG. 8):

$P_{n,i}$=Probability of being in state IDLEn, where n=0 .. N.
$P_{n,b}$=Probability of being in state BUSYn, where n=0 .. N.
λ=rate of transition from state IDLEn to state BUSYn+1.
μ=rate of transition from state BUSYn to state IDLEn−1.
Ω=rate of transition from state IDLEn to state IDLEn−1 or from state BUSYn to state BUSYn−1.
ν=rate of transition from state BUSYn to state IDLEn.
ω=rate of transition from state BUSYn to state BUSYn.

| State | Rate of arrival | Rate of departure |
|---|---|---|
| 1 | $\lambda.P_{0,i} + \Omega.P_{2,i}$ | $\nu.P_{1,b} + \mu.P_{1,b}$ |
| 2 | $\lambda.P_{1,i} + \Omega.P_{3,i}$ | $\nu.P_{2,b} + \mu P_{2,b} + \Omega.P_{2,b}$ |
| : | : | : |
| N | $\lambda.P_{N-1,i,}$ | $\nu.P_{N,b} + \mu P_{N,b} + \Omega.P_{N,b}$ |

For purposes of simulation, values for ω, λ, μ, ν, and Ω, were calculated based on some assumptions and the following market data:

TMSI reallocation done each time the LA change=yes
0.5 periodic Location Update/subscriber/hour (busy hour)
0.55 Intra-VLR Location Updating (including Attach of already registered subscribers)/subscriber/hour (busy hour)
0.28 Inter-VLR Location Updating (Attach with new registration towards HLR)/subscriber/hour (busy hour)
0.15 Detach/subscriber/hour (busy hour)

Figure 9:
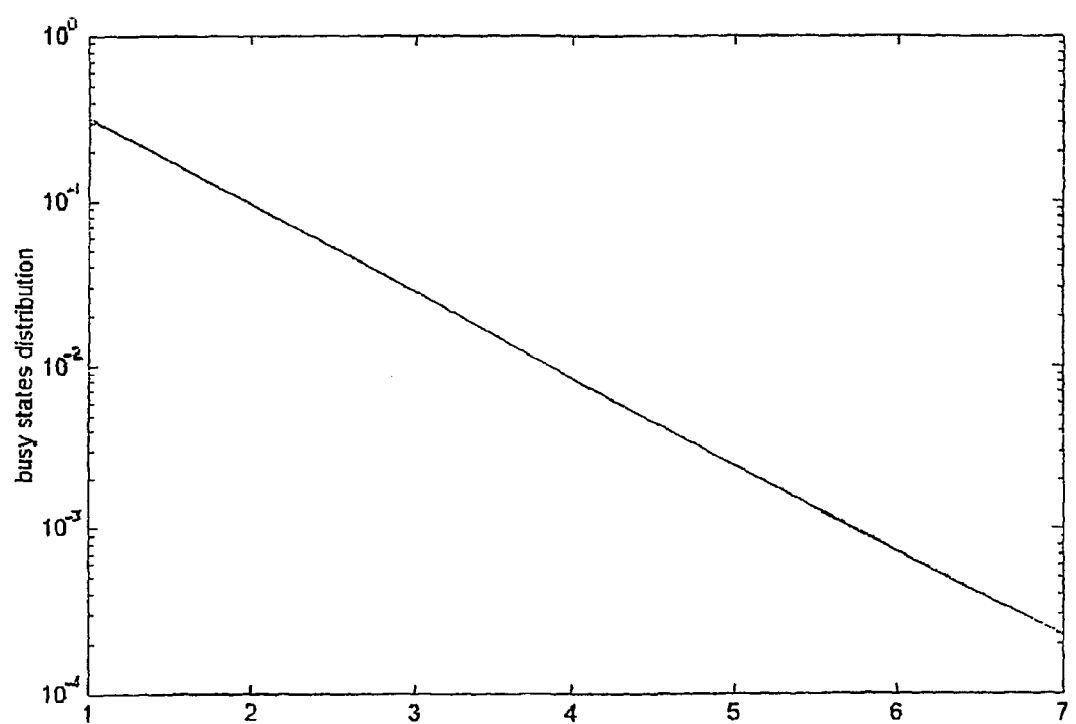
FIG. 9 is a probability graph for a BUSY state distribution determined in accordance with one aspect of the invention.
Figure 10:
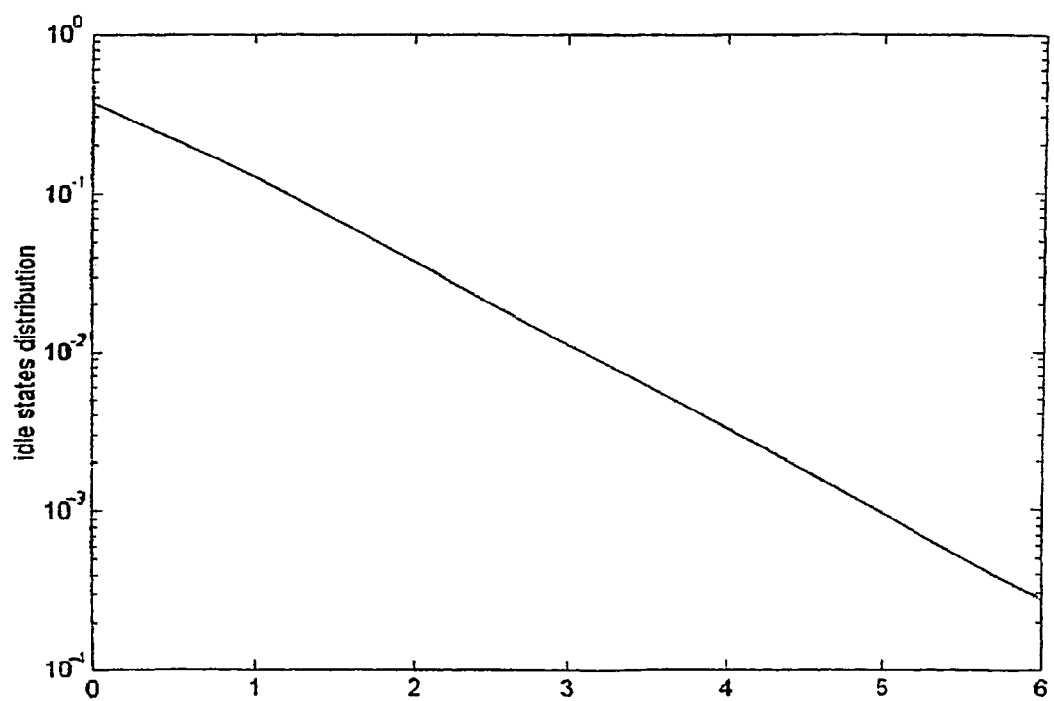
FIG. 10 is a probability graph for an IDLE state distribution determined in accordance with one aspect of the invention.

Considering the following values, with stage 8 calculations, the probability graphs for the BUSY state distribution is depicted in FIG. 9, and the probability graph for the IDLE state distribution is depicted in FIG. 10.

Values: λ=0.32, μ=0.34, ν=0.045, Ω=0.065

These graphs were calculated using the program MatLab. The purpose of this calculation is to demonstrate that for a value "i=8" on the horizontal axis, the probability of being in state $P_{b,8}$ or $P_{i,8}$ falls below 10e-4. Based on this demonstration, it can be concluded that a value of 32 for the TMSI generation field is sufficient to cover values up to 8 (or even higher) with a probability of conflict of less than 10e-4.

A number of benefits can be achieved by applying the various inventive techniques described herein. For example, the size of the TMSI generation field can be reduced (e.g., to a 5-bit field as proposed for current standards) while limiting the probability of running out of space or of double allocation of TMSIs.

In other words: the performance of conventional TMSI allocation techniques can be achieved but with a much lower amount of needed bits in the TMSI. The bits saved in this manner are then free for use for such things as load distribution, (e.g., the MSC/SGSN in pool concept described earlier).

Without the invention the risk of running out of space and/or of having double allocation of TMSIs would be much higher.

Also, performing a normal deallocation adjustment (e.g., step 613) on the TMSI generation field value each time a subscriber moves to a different service area, instead of just keeping the value unchanged until the next allocation of a TMSI identification field value, will dramatically reduce the spreading of the TMSI generation field values within the Server. This will result in a better utilization of this parameter in cases in which the TMSI generation range is not "infinite", for example 32 possible values as in current 3GPP standardization proposals supporting load distribution within 2G and 3G networks.

An alternative to the techniques described above would be to just extend the size of the TMSI or create even a new information element. But this would mean much bigger changes in the different involved nodes (terminal, base station, BSC, RNC, MSC, SGSN). This means that the invention achieves the wanted effect with the least impact on the system and in that way with the least costs.

Another benefit of the invention is that the spreading of the TMSI generation field values is essentially independent of user mobility behaviors.

Yet another advantage to using the techniques described herein is that the optimal TMSI generation adjustment amount needed after the restart of a node (VLR and SGSN) need only be as large as necessary, and no larger.

Furthermore, the techniques described above are easy to describe from a statistical perspective. This gives a powerful tool for predicting the TMSIs' spreading, and finally the most correct step value to be used after node restarts. This is in sharp contrast to just relying on the huge possibilities given so far by the current TMSI generation field (12 bits, or 3072 for CS and 1024 for PS possible generations).

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in anyway. The scope of the invention is given by the appended claims, rather than the preceding description, and all variations and equivalents which fall within the range of the claims are intended to be embraced therein.

What is claimed is:

1. A method of performing a special adjustment to a temporary mobile subscriber identity generation field value for use in response to a restart operation, the method comprising:

determining a minimum integer amount that is higher than temporary mobile subscriber identity generation field values associated with a predetermined percentage of all mobile subscriber, wherein determining the minimum integer amount comprises:

determining a probability density as a function of temporary mobile subscriber identity generation value;

integrating the probability density across an entire range of temporary mobile subscriber identity generation values to determine a total integral; and determining the minimum integer amount such that an integral of the probability density from zero to the minimum integer amount yields a smaller integral that is the predetermined percentage of the total integral; and adjusting the temporary mobile subscriber identity generation field value as a function of the minimum integer amount.

2. The method of claim 1, wherein the step of adjusting the temporary mobile subscriber identity generation field value as a function of the minimum integer amount comprises setting the temporary mobile subscriber identity generation field value equal to the minimum integer amount.

3. A method of managing a temporary mobile subscriber identity for allocation to a mobile subscriber, wherein the temporary mobile subscriber identity comprises a temporary mobile subscriber identity identification field and a temporary mobile subscriber identity generation field, the method comprising:

selecting a free temporary mobile subscriber identity identification field value;

determining a present temporary mobile subscriber identity generation field value associated with the selected temporary mobile subscriber identity identification field value;

if the free temporary mobile subscriber identity identification field value has previously been allocated since a most recent restart operation, then performing a normal allocation adjustment to the present temporary mobile subscriber identity generation field value, thereby producing an adjusted temporary mobile subscriber identity generation field value;

if the free temporary mobile subscriber identity identification field value has not previously been allocated since a most recent restart operation, then performing a special allocation adjustment to the present temporary mobile subscriber identity generation field value, thereby producing the adjusted temporary mobile subscriber identity generation field value;

generating a complete temporary mobile subscriber identity from the selected temporary mobile subscriber identity identification value and the adjusted temporary mobile subscriber identity generation field value;

allocating the complete temporary mobile subscriber identity to the mobile subscriber;

in response to a first type of release causing event in which the mobile subscriber is informed that the temporary mobile subscriber identity is being released, processing the temporary mobile subscriber identity identification value so that it will be considered free, and performing a normal deallocation adjustment to the adjusted temporary mobile subscriber identity generation field value; and in response to a second type of release causing event in which the mobile subscriber is not informed that the temporary mobile subscriber identity is being released, processing the temporary mobile subscriber identity identification value so that it will be considered free, and leaving the adjusted temporary mobile subscriber identity generation field value unchanged, wherein the special allocation adjustment comprises changing the present temporary mobile subscriber identity generation field value as a function of a minimum integer amount that is higher than temporary mobile subscriber identity generation field values associated with a predetermined percentage of all mobile subscribers.

4. The method of claim 3, wherein the special allocation adjustment comprises setting the present temporary mobile subscriber identity generation field value equal to the minimum integer amount that is higher than temporary mobile subscriber identity generation field values associated with the predetermined percentage of all mobile subscribers.

5. The method of claim 3, further comprising:

in response to the restart operation, processing all temporary mobile subscriber identity identification values so that none of the temporary mobile subscriber identity identification values will be considered unused.

6. The method of claim 3, wherein the normal allocation adjustment to the present temporary mobile subscriber identity generation field value comprises changing the present temporary mobile subscriber identity generation field value by a predetermined value.

7. The method of claim 3, wherein the normal deallocation adjustment to the adjusted temporary mobile subscriber identity generation field value comprises performing an operation that restores the adjusted temporary mobile subscriber identity generation field value to the present temporary mobile subscriber identity generation field value.

8. The method of claim 3, wherein the normal allocation adjustment to the present temporary mobile subscriber identity generation field value comprises incrementing the temporary mobile subscriber identity generation field value by an amount equal to 1.

9. The method of claim 8, wherein the normal deallocation adjustment to the adjusted temporary mobile subscriber identity generation field value comprises subtracting a value of 1 from the adjusted temporary mobile subscriber identity generation field value.

10. The method of claim 3, further comprising determining the minimum integer amount that is higher than temporary mobile subscriber identity generation field values associated with the predetermined percentage of all mobile subscribers, and wherein the step of determining the minimum integer amount that is higher than temporary mobile subscriber identity generation field values associated with the predetermined percentage of all mobile subscribers comprises:

determining a probability density as a function of temporary mobile subscriber identity generation value;

integrating the probability density across an entire range of temporary mobile subscriber identity generation values to determine a total integral; and determining the minimum integer amount such that an integral of the probability density from zero to the integer amount yields a smaller integral that is the predetermined percentage of the total integral.

11. An apparatus for performing a special adjustment to a temporary mobile subscriber identity generation field value for use in response to a restart operation, the apparatus comprising:

logic that determines a minimum integer amount that is higher than temporary mobile subscriber identity generation field values associated with a predetermined percentage of all mobile subscribers, wherein the logic that determines the minimum integer amount further comprises;
  logic that determines a probability density as a function of temporary mobile subscriber identity generation value;
  logic that integrates the probability density across an entire range of temporary mobile subscriber identity generation values to determine a total integral; and
  logic that determines the minimum integer amount such that an integral of the probability density from zero to the minimum integer amount yields a smaller integral that is the predetermined percentage of the total integral; and
  logic that adjusts the temporary mobile subscriber identity generation field value as a function of the minimum integer amount.

12. The apparatus of claim 11, wherein the logic that adjusts the temporary mobile subscriber identity generation field value as a function of the minimum integer amount comprises logic that sets the temporary mobile subscriber identity generation field value equal to the minimum integer amount.

13. An apparatus for managing a temporary mobile subscriber identity for allocation to a mobile subscriber, wherein the temporary mobile subscriber identity comprises a temporary mobile subscriber identity identification field and a temporary mobile subscriber identity generation field, the apparatus comprising:
  logic that selects a free temporary mobile subscriber identity identification field value;
  logic that determines a present temporary mobile subscriber identity generation field value associated with the selected temporary mobile subscriber identity identification field value;
  logic that, if the free temporary mobile subscriber identity identification field value has previously been allocated since a most recent restart operation, performs a normal allocation adjustment to the present temporary mobile subscriber identity generation field value, thereby producing an adjusted temporary mobile subscriber identity generation field value;
  logic that, if the free temporary mobile subscriber identity identification field value has not previously been allocated since a most recent restart operation, performs a special allocation adjustment to the present temporary mobile subscriber identity generation field value, thereby producing the adjusted temporary mobile subscriber identity generation field value;
  logic that generates a complete temporary mobile subscriber identity from the selected temporary mobile subscriber identity identification value and the adjusted temporary mobile subscriber identity generation field value;
  logic that allocates the complete temporary mobile subscriber identity to the mobile subscriber;
  logic that, in response to a first type of release causing event in which the mobile subscriber is informed that the temporary mobile subscriber identity is being released, processes the temporary mobile subscriber identity identification value so that it will be considered free, and performing a normal deallocation adjustment to the adjusted temporary mobile subscriber identity generation field value; and
  logic that, in response to a second type of release causing event in which the mobile subscriber is not informed that the temporary mobile subscriber identity is being released, processes the temporary mobile subscriber identity identification value so that it will be considered free, and leaving the adjusted temporary mobile subscriber identity generation field value unchanged,
  wherein the logic that performs the special allocation adjustment comprises logic that changes the present temporary mobile subscriber identity generation field value as a function of a minimum integer amount that is higher than temporary mobile subscriber identity generation field values associated with a predetermined percentage of all mobile subscribers.

14. The apparatus of claim 13, wherein the logic that performs the special allocation adjustment comprises logic that sets the present temporary mobile subscriber identity generation field value equal to the minimum integer amount that is higher than temporary mobile subscriber identity generation field values associated with the predetermined percentage of all mobile subscribers.

15. The apparatus of claim 13, further comprising:
  logic that, in response to the restart operation, processes all temporary mobile subscriber identity identification values so that none of the temporary mobile subscriber identity identification values will be considered unused.

16. The apparatus of claim 13, wherein the logic that performs the normal allocation adjustment to the present temporary mobile subscriber identity generation field value comprises logic that changes the present temporary mobile subscriber identity generation field value by a predetermined value.

17. The apparatus of claim 13, wherein the logic that performs the normal deallocation adjustment to the adjusted temporary mobile subscriber identity generation field value comprises logic that performs an operation that restores the adjusted temporary mobile subscriber identity generation field value to the present temporary mobile subscriber identity generation field value.

18. The apparatus of claim 13, wherein the logic that performs the normal allocation adjustment to the present temporary mobile subscriber identity generation field value comprises logic that increments the temporary mobile subscriber identity generation field value by an amount equal to 1.

19. The apparatus of claim 18, wherein the logic that performs the normal deallocation adjustment to the adjusted temporary mobile subscriber identity generation field value comprises logic that subtracts a value of 1 from the adjusted temporary mobile subscriber identity generation field value.

20. The apparatus of claim 13, further comprising logic that determines the minimum integer amount that is higher than temporary mobile subscriber identity generation field values associated with the predetermined percentage of all mobile subscribers,
  and wherein the logic that determines the minimum integer amount that is higher than temporary mobile subscriber identity generation field values associated with the predetermined percentage of all mobile subscribers comprises:
  logic that determines a probability density as a function of temporary mobile subscriber identity generation value;
  logic that integrates the probability density across an entire range of temporary mobile subscriber identity generation values to determine a total integral; and
  logic that determines the minimum integer amount such that an integral of the probability density from zero to the integer amount yields a smaller integral that is the predetermined percentage of the total integral.

* * * * *